(12) United States Patent
Schroeder et al.

(10) Patent No.: US 11,692,767 B2
(45) Date of Patent: Jul. 4, 2023

(54) REFRIGERATOR APPLIANCE AND METHODS OF USER IDENTIFICATION

(71) Applicant: Haier US Appliance Solutions, Inc., Wilmington, DE (US)

(72) Inventors: Michael Goodman Schroeder, Louisville, KY (US); Sarah Virginia Morris, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 380 days.

(21) Appl. No.: 17/064,778

(22) Filed: Oct. 7, 2020

(65) Prior Publication Data

US 2022/0107131 A1    Apr. 7, 2022

(51) Int. Cl.
*F25D 29/00* (2006.01)
*G06V 20/52* (2022.01)
*G06V 20/68* (2022.01)

(52) U.S. Cl.
CPC ............ *F25D 29/00* (2013.01); *G06V 20/52* (2022.01); *F25D 2500/06* (2013.01); *F25D 2700/04* (2013.01); *F25D 2700/06* (2013.01); *G06V 20/68* (2022.01)

(58) Field of Classification Search
CPC .. F25D 29/00; F25D 2500/06; F25D 2700/04; F25D 2700/06; G06V 20/52; G06V 20/68
See application file for complete search history.

(56) References Cited

U.S. PATENT DOCUMENTS

| 10,395,764 | B2 | 8/2019 | Guan | |
|---|---|---|---|---|
| 10,902,237 | B1* | 1/2021 | Aggarwal | G06V 10/24 |
| 2016/0085958 | A1 | 3/2016 | Kang | |
| 2016/0217417 | A1 | 7/2016 | Suranjit | |
| 2019/0087966 | A1 | 3/2019 | Abdoo | |
| 2019/0392383 | A1* | 12/2019 | Han | F25D 27/005 |
| 2020/0027218 | A1 | 1/2020 | Buibas | |
| 2021/0182922 | A1* | 6/2021 | Zheng | G06V 10/764 |

FOREIGN PATENT DOCUMENTS

CN    110807363 A    2/2020

* cited by examiner

*Primary Examiner* — Laura A Gudorf
(74) *Attorney, Agent, or Firm* — Dority & Manning, P.A.

(57) ABSTRACT

A refrigerator appliance may include a cabinet, a door, a camera module, and a controller. The camera module may be mounted to the cabinet. The controller may be operably coupled to the camera module. The controller may be configured to initiate an operation routine. The operation routine may include initiating an image capture sequence at the camera module. The image capture sequence may include a two-dimensional image captured at the camera module. The operation routine may further include determining an appendage-occupied region within the two-dimensional image and analyzing the appendage-occupied region in response to determining the appendage-occupied region. The operation routine may still further include assigning a confidence score to a user profile stored in the controller based on analyzing the appendage-occupied region, comparing the assigned confidence score to a threshold score, and recording metadata regarding the two-dimensional image based on comparing the assigned confidence score.

20 Claims, 6 Drawing Sheets

REFRIGERATOR APPLIANCE AND METHODS OF USER IDENTIFICATION

FIELD OF THE INVENTION

The present subject matter relates generally to tracking users of and items within a storage enclosure, such as a refrigerator appliance.

BACKGROUND OF THE INVENTION

Storage enclosures, such as refrigerator appliances and pantries, generally provide an enclosed chamber for receiving multiple items or objects. For example, refrigerator appliances generally include a cabinet that defines a chilled chamber. A user can place food items or objects within the chilled chamber in order to hinder perishing of such food items. Thereby, a useable life of perishable items or objects can be increased.

Over time, a large volume or number of stored items (e.g., food items) can accumulate within the refrigerator's chilled chamber. As stored items accumulate, users of the refrigerator appliance can have difficulty identifying the items located within the refrigerator appliance. Additionally, users can have difficulty determining a quantity of certain items within the refrigerator appliance. This is especially true when multiple users add/remove items from a common refrigerator appliance without communicating with other users. Consequently, the users may accidentally purchase excessive or undesired items. For example, certain food items do not readily perish within the chilled chamber, and such food items may be consumed infrequently. Thus, such food items can remain within the chilled chamber for extended periods of time. The users can forget about such food items and purchase replacements despite already having acceptable items. In such a manner, the users can be inconvenienced or expend money needlessly. Additionally or alternatively, some users may be unaware that certain items have been removed or consumed. Thus, users may fail to replace or replenish such items.

Separate from or in addition to tracking items within an appliance, it may be desirable to track which items are consumed or removed by a particular user. Such tracking may help users determine consumption habits or caloric intake.

Some existing appliances have attempted to address these issues by requiring a user to manually input each item being stored. Other appliances have used various methods, such as scales, to estimate or guess the quantity or identification of items being stored or consumed. Nonetheless, such attempts have been insufficiently cumbersome and prone to inaccuracies. These drawbacks may be magnified if multiple users interact with a particular appliance.

Accordingly, a refrigerator appliance with features for assisting a user with tracking contents of a chilled chamber of the refrigerator appliance would be useful. Additionally or alternatively, a refrigerator appliance with features for identifying multiple users and, optionally, items added/removed from the chilled chamber would be useful.

BRIEF DESCRIPTION OF THE INVENTION

Aspects and advantages of the invention will be set forth in part in the following description, or may be obvious from the description, or may be learned through practice of the invention.

In one exemplary aspect of the present disclosure, a refrigerator appliance is provided. The refrigerator appliance may include a cabinet, a door, a camera module, and a controller. The cabinet may define a chilled chamber. The door may be rotatably hinged to the cabinet to provide selective access to the chilled chamber. The camera module may be mounted to the cabinet. The controller may be operably coupled to the camera module. The controller may be configured to initiate an operation routine. The operation routine may include initiating an image capture sequence at the camera module. The image capture sequence may include a two-dimensional image captured at the camera module. The operation routine may further include determining an appendage-occupied region within the two-dimensional image and analyzing the appendage-occupied region in response to determining the appendage-occupied region. The operation routine may still further include assigning a confidence score to a user profile stored in the controller based on analyzing the appendage-occupied region, comparing the assigned confidence score to a threshold score, and recording metadata regarding the two-dimensional image based on comparing the assigned confidence score.

In another exemplary aspect of the present disclosure, a method of operating a refrigerator appliance is provided. The method may include initiating an image capture sequence at the camera module. The image capture sequence may include a two-dimensional image captured at the camera module. The method may further include determining an appendage-occupied region within the two-dimensional image and analyzing the appendage-occupied region in response to determining the appendage-occupied region. The method may still further include assigning a confidence score to a user profile stored in the controller based on analyzing the appendage-occupied region, comparing the assigned confidence score to a threshold score, and recording metadata regarding the two-dimensional image based on comparing the assigned confidence score.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the term "or" is generally intended to be inclusive (i.e., "A or B" is intended to mean "A or B or both"). The terms "first," "second," and "third" may be used interchangeably to distinguish one component from another and are not intended to signify location or importance of the individual components.

Generally, the present disclosure provides methods to aid in identifying users interacting or engaging with a storage enclosure, such as a refrigerator appliance or pantry. The methods may include one or more steps for automatically (e.g., without direct user input) discerning which user has added or removed an item from the appliance (e.g., to associate such actions with that user).

Figure 1:
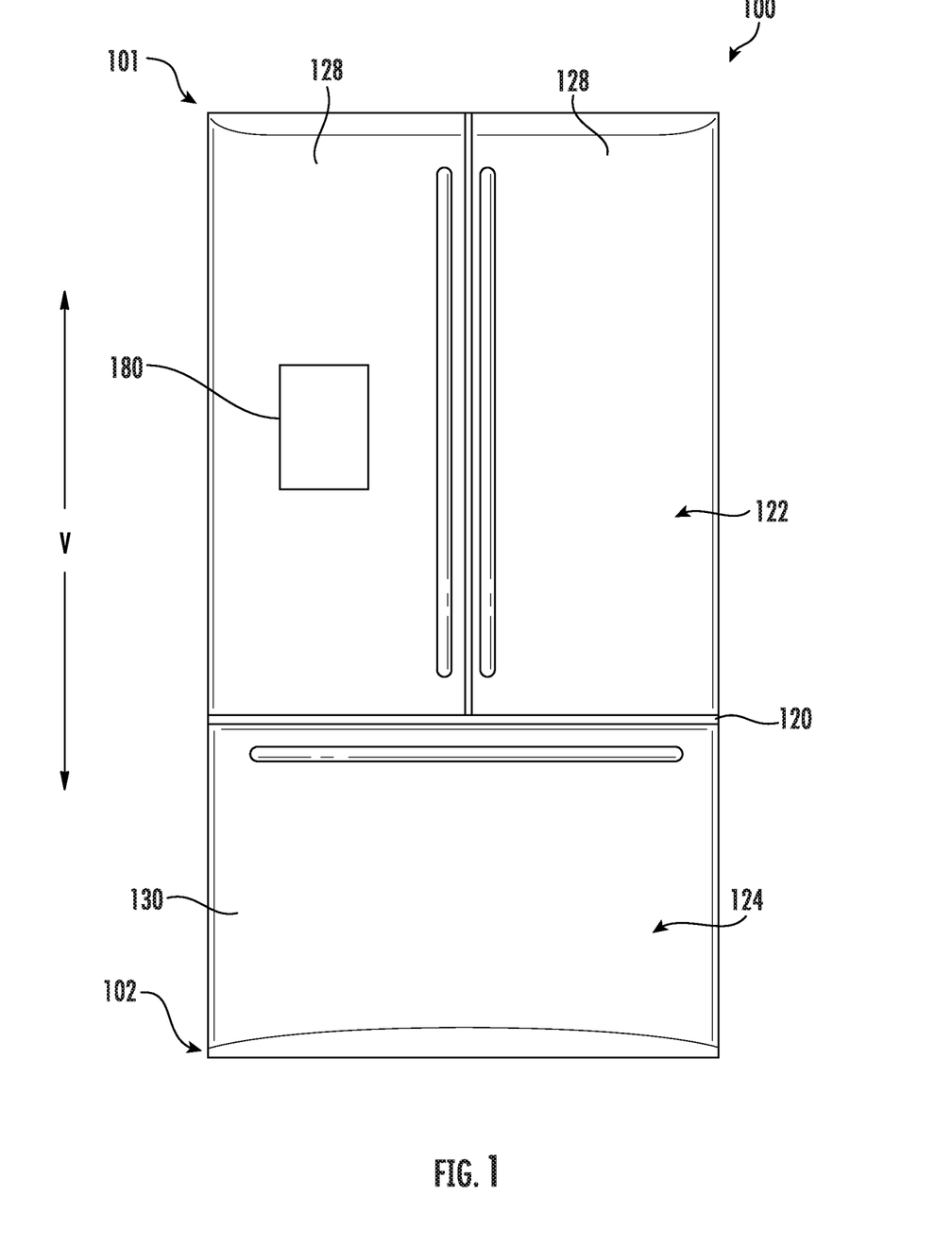
FIG. 1 provides a front elevation view of a refrigerator appliance according to exemplary embodiments of the present disclosure.
Figure 2:
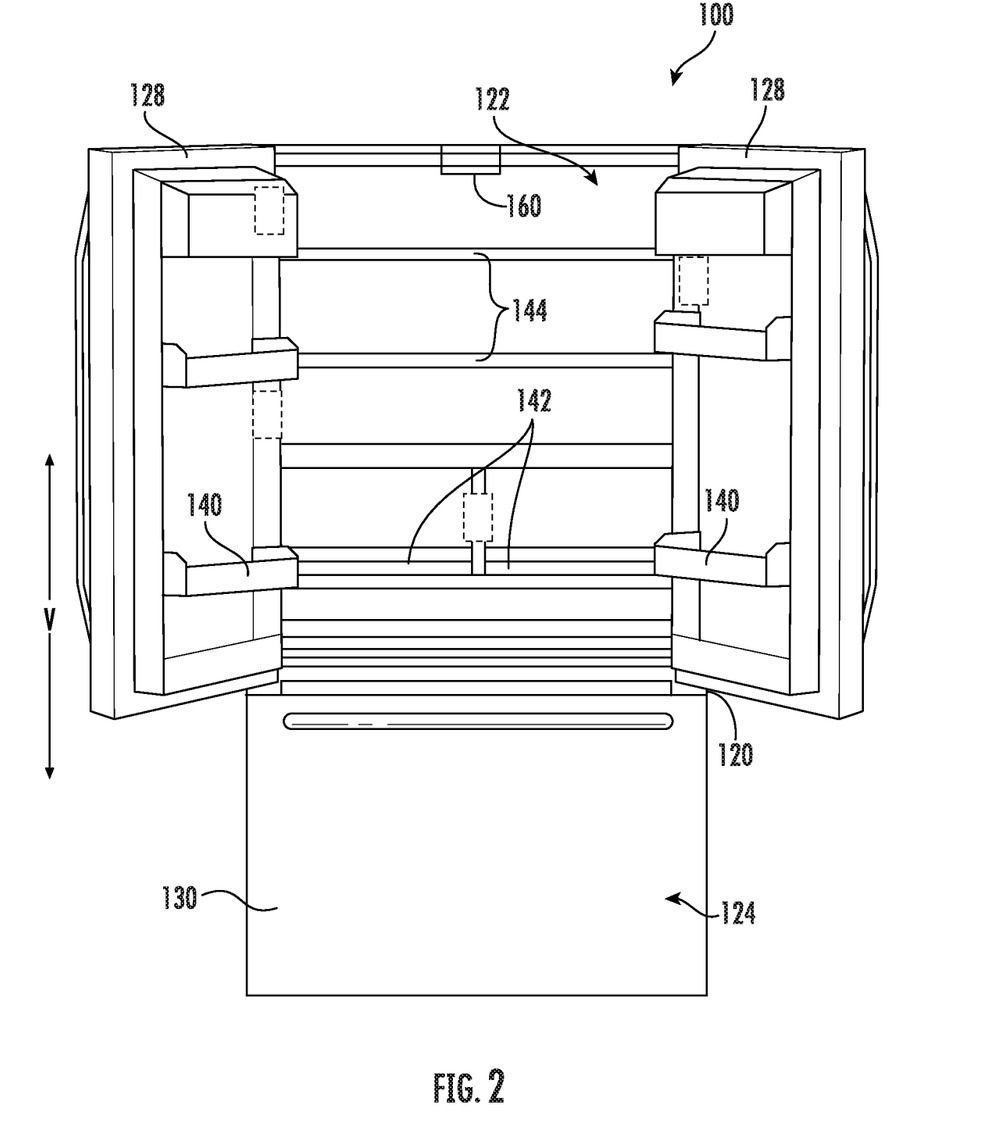
FIG. 2 provides a front elevation view of a refrigerator appliance according to exemplary embodiments of the present disclosure, wherein refrigerator doors are shown in an open position.

Turning now to the figures, FIG. 1 provides a front elevation view of a refrigerator appliance 100 according to exemplary embodiments of the present disclosure with refrigerator doors 128 of the refrigerator appliance 100 shown in a closed position. FIG. 2 provides a front view elevation of refrigerator appliance 100 with refrigerator doors 128 shown in an open position to reveal a fresh food chamber 122 of refrigerator appliance 100.

Refrigerator appliance 100 includes a housing or cabinet 120 that extends between a top 101 and a bottom 102 along a vertical direction V. Cabinet 120 defines chilled chambers for receipt of food items for storage. In particular, cabinet 120 defines fresh food chamber 122 positioned at or adjacent top 101 of cabinet 120 and a freezer chamber 124 arranged at or adjacent bottom 102 of cabinet 120. As such, refrigerator appliance 100 is generally referred to as a bottom mount refrigerator. It is recognized, however, that the benefits of the present disclosure apply to other types and styles of storage enclosure, such as a top mount refrigerator appliance, a side-by-side style refrigerator appliance, or an unrefrigerated pantry enclosure. Consequently, the description set forth herein is for illustrative purposes only and is not intended to be limiting in any aspect to any particular storage enclosure or refrigerator chamber configuration.

Refrigerator doors 128 are rotatably hinged to an edge of cabinet 120 for selectively accessing fresh food chamber 122. In addition, a freezer door 130 is arranged below refrigerator doors 128 for selectively accessing freezer chamber 124. Freezer door 130 is coupled to a freezer drawer 142 (not shown) slidably mounted within freezer chamber 124. As discussed above, refrigerator doors 128 and freezer door 130 are shown in the closed configuration in FIG. 1, and refrigerator doors 128 are shown in the open position in FIG. 2.

Turning now to FIG. 2, various storage components are mounted within fresh food chamber 122 to facilitate storage of food items therein as will be understood by those skilled in the art. In particular, the storage components include bins 140, drawers 142, and shelves 144 that are mounted within fresh food chamber 122. Bins 140, drawers 142, and shelves 144 are configured for receipt of stored items (e.g., beverages or solid food items) and may assist with organizing such food items. As an example, drawers 142 can receive fresh food items (e.g., vegetables, fruits, or cheeses) and increase the useful life of such fresh food items.

Refrigerator appliance 100 also includes features for assisting a user with identifying food items positioned within fresh food chamber 122 or freezer chamber 124. The user can utilize such features, for example, to view food items stored (i.e., stored items) within fresh food chamber 122 or freezer chamber 124 or create an inventory of such stored items. Such features are discussed in greater detail below.

Figure 3:
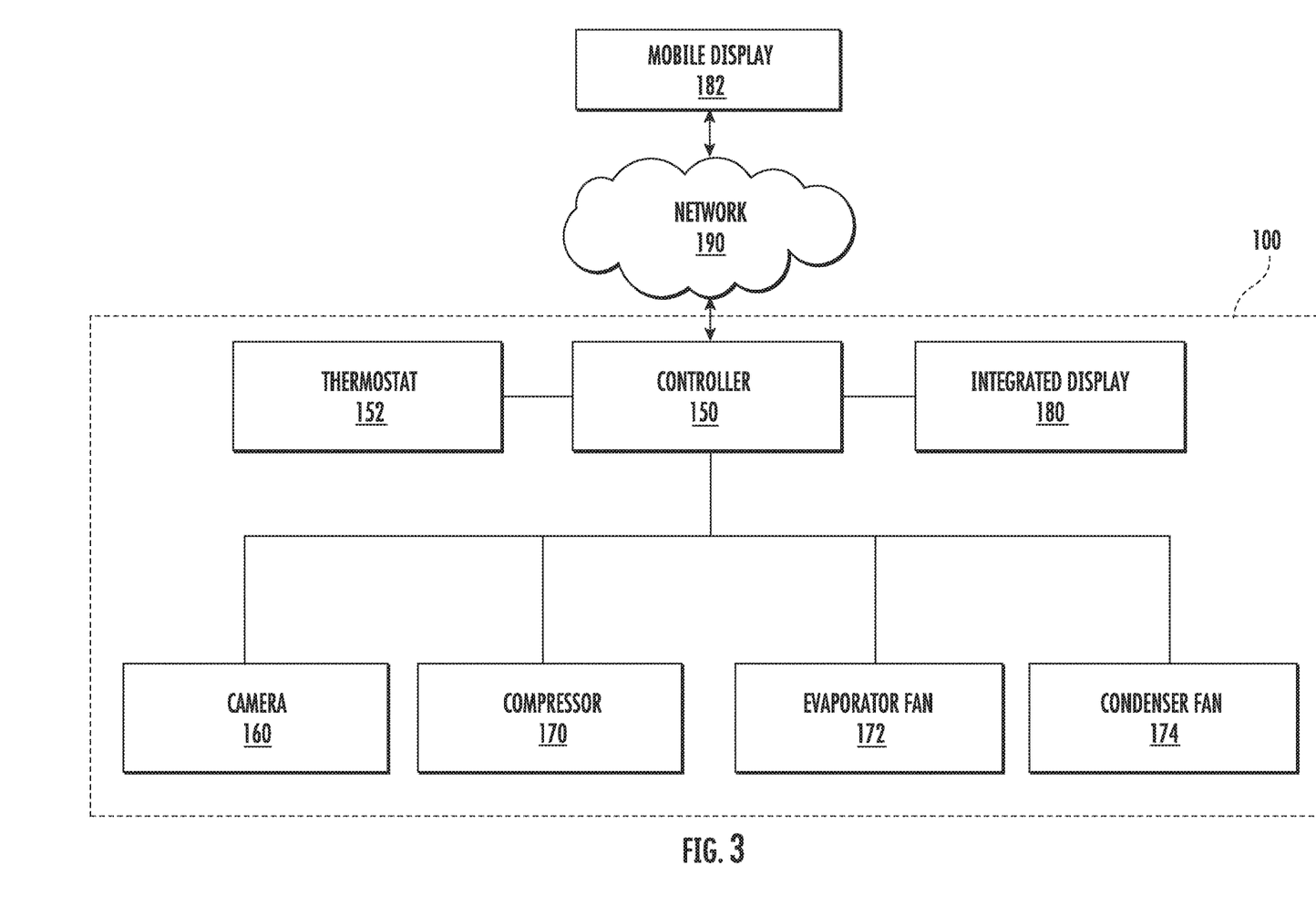
FIG. 3 provides a schematic view of a refrigerator appliance according to exemplary embodiments of the present disclosure.

FIG. 3 provides a schematic view of refrigerator appliance 100. Refrigerator appliance 100 includes a controller 150 that is operatively coupled or in communication with components of a refrigeration system (not shown) of refrigerator appliance 100 configured for cooling fresh food chamber 122 or freezer chamber 124. The components include a compressor 170, an evaporator fan 172, and a condenser fan 174. Controller 150 can selectively operate such components in order to cool fresh food chamber 122 or freezer chamber 124. Controller 150 is also in communication with a thermostat (e.g., a thermocouple or thermistor). The thermostat may be positioned in fresh food compartment 122 or freezer compartment 124 (FIG. 2). Controller 150 may receive a signal from the thermostat that corresponds to a temperature of fresh food compartment 122 or freezer compartment 124. Controller 150 may also include an internal timer for calculating elapsed time periods.

Controller 150 may include a memory and one or more microprocessors, CPUs or the like, such as general or special purpose microprocessors operable to execute programming instructions or micro-control code associated with operation of refrigerator appliance 100. The memory may represent random access memory, such as DRAM, or read only memory such as ROM or FLASH. In some embodiments, the processor executes non-transitory programming instructions stored in memory. For certain embodiments, the instructions include a software package configured to operate appliance 100 or execute an operation routine (e.g., the exemplary method 600 described below with reference to FIG. 6). The memory may be a separate component from the processor or may be included onboard within the processor. Alternatively, controller 150 may be constructed without using a microprocessor (e.g., using a combination of discrete analog or digital logic circuitry; such as switches, amplifiers, integrators, comparators, flip-flops, AND gates, and the like) to perform control functionality instead of relying upon software.

Controller 150 may be positioned in a variety of locations throughout refrigerator appliance 100. Input/output ("I/O") signals may be routed between controller 150 and various operational components of refrigerator appliance 100. One or more components of refrigerator appliance 100 may be in operative communication (e.g., electric communication) with controller 150 via one or more conductive signal lines or shared communication busses. Additionally or alternatively, one or more components of refrigerator appliance 100 may be in operative communication (e.g., wireless communication) with controller 150 via one or more wireless signal bands.

Refrigerator appliance 100 also includes a camera or camera module 160. Camera 160 may be any type of device suitable for capturing a two-dimensional picture or image, such the image illustrated in FIG. 4 or FIG. 5. As an example, camera 160 may be a video camera or a digital camera with an electronic image sensor [e.g., a charge coupled device (CCD) or a CMOS sensor]. When assembled, camera 160 is in communication (e.g., electric or wireless communication) with controller 150 such that controller 150 may receive a signal from camera 160 corresponding to the image captured by camera 160.

Generally, camera 160 is positioned within refrigerator appliance 100 and is directed toward one or more chilled chamber (e.g., fresh food chamber 122—FIG. 2). In some embodiments, camera 160 is mounted within fresh food chamber 122 at a top portion thereof (e.g., adjacent top 101). For instance, camera 160 may be fixed to or directed through a top wall of an internal liner defining fresh food chamber 122. In such embodiments, camera 160 may be directed downward, as illustrated in FIG. 2. Additionally or alternatively, a plurality of discrete cameras 160 (e.g., indicated in phantom lines at FIG. 2) may be directed inward towards the fresh food chamber 122 from separate sides or regions of appliance 100 (e.g., a left side of chamber 122, right side of chamber 122, door 128, drawers 142, shelves 144, etc.). Thus, multiple cameras 160 having different fields of view of chamber 122 may be provided within appliance.

When assembled, camera(s) 160 may be directed towards at least a portion of any particular one of or combination of drawers 142 and shelves 144 (FIG. 2). Thus, camera 160 can capture images of one of drawers 142, all of drawers 142, one of shelves 144, all of shelves 144, or any suitable combination thereof.

In certain embodiments, refrigerator appliance 100 includes an integrated display 180. Integrated display 180 may be mounted on refrigerator door 128 (FIG. 1) or at any other suitable location on refrigerator appliance 100. Integrated display 180 is in operative communication with controller 150 such that integrated display 180 may receive a signal from controller 150 corresponding to an image captured by camera 160. Integrated display 180 can receive such signal from controller 150 and present the image to a user visually. Integrated display 180 may include, for example, a liquid crystal display panel (LCD), a plasma display panel (PDP), or any other suitable mechanism for displaying an image (e.g., a projector).

In additional or alternative embodiments, refrigerator appliance 100 includes a network interface (not shown) that couples refrigerator appliance 100 (e.g., controller 150) to a network 190 such that refrigerator appliance 100 can transmit and receive information over network 190. Network 190 can be any wired or wireless network such as a WAN, LAN, or HAN.

In some such embodiments, refrigerator appliance 100 (e.g., controller 150) is in communication with a mobile display 182 via network 190. Mobile display 182 can be any device configured to communicate over network 190 and display images received therefrom. For example, mobile display 182 may be a computer, a smartphone, or a tablet. Mobile display 182 is in communication with controller 150 such that mobile display 182 may receive a signal from controller 150 (via network 190) corresponding to a user interface or an image captured by camera 160. Mobile display 182 can receive such signal from controller 150 and present one or more images to a user visually. Mobile display 182 may include, for example, a liquid crystal display panel (LCD), a plasma display panel (PDP), or any other suitable mechanism for displaying an image (e.g., a projector). Mobile display 182 can also include an interface (e.g., tactile inputs, such as buttons, or a graphical user interface) that allows mobile display 182 to initiate communications with refrigerator appliance 100 over network 190.

During use, such as during an image capture sequence, one or more cameras 160 may capture one or more two-dimensional images (e.g., as a video feed or series of sequential static images) that may be transmitted to the controller 150 (e.g., as a data signal), as is generally understood. From the captured images, items (e.g., stored items, such as food, or non-stored items such as a user appendage, a shelf, a movable drawer, etc.) within the field of view (e.g., set field of view) for the camera(s) 160 may be automatically identified by the controller 150. As is understood, recognizing or identifying such items, may be performed by edge matching, divide-and-conquer search, greyscale matching, histograms of receptive field responses, or another suitable routine (e.g., executed at the controller 150 based on one or more captured images from one or more cameras 160).

Figure 4:
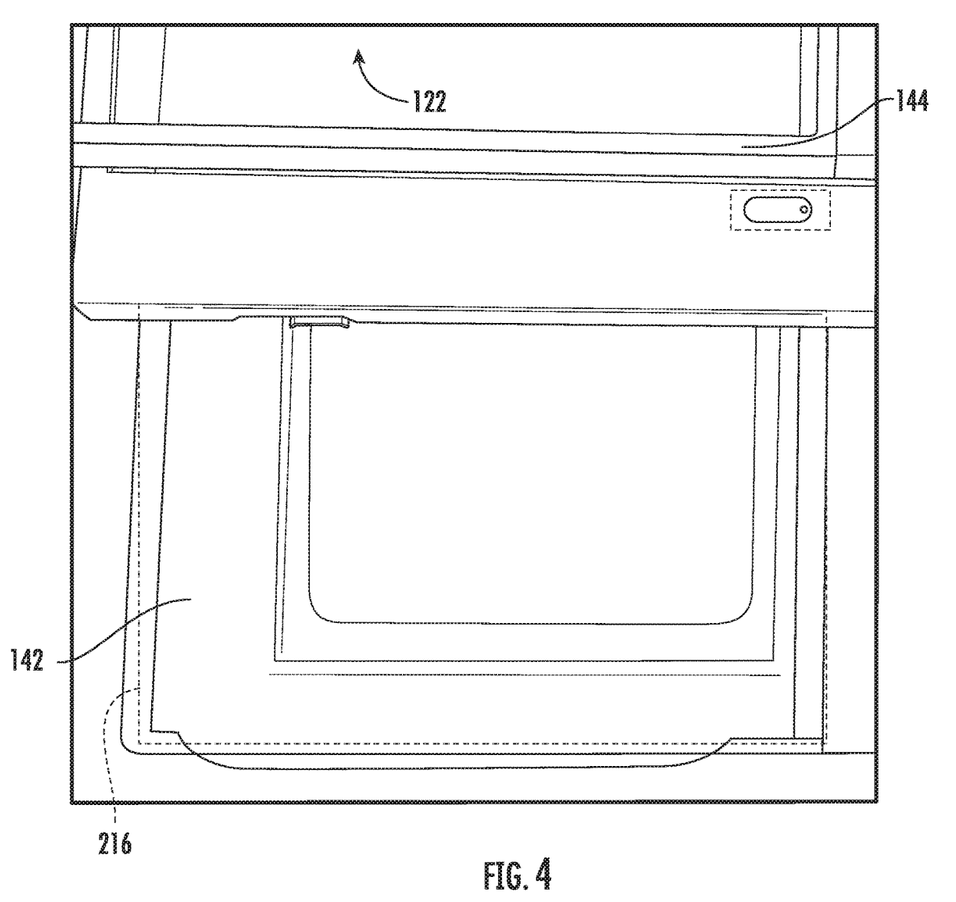
FIG. 4 illustrates an exemplary two-dimensional image of a drawer of a refrigerator appliance captured at a camera assembly of the refrigerator appliance according to exemplary embodiments of the present disclosure.
Figure 5:
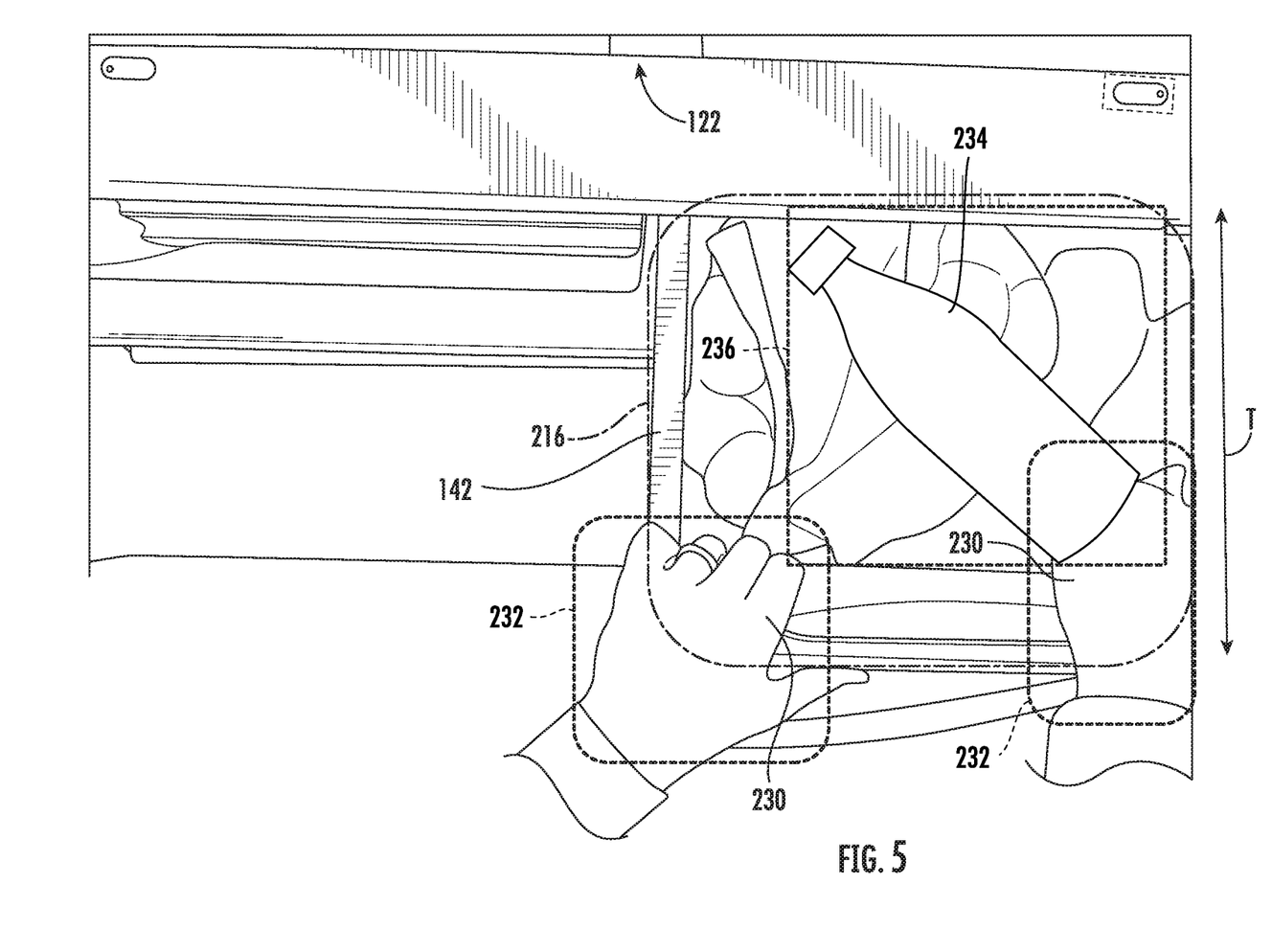
FIG. 5 illustrates an exemplary two-dimensional image of a drawer of a refrigerator appliance captured at a camera assembly of the refrigerator appliance according to exemplary embodiments of the present disclosure.

Turning now to FIGS. 4 and 5, various exemplary two-dimensional images related to drawer storage are illustrated, such as might be captured at camera 160 (FIG. 2), viewed at integrated display 180 (FIG. 3), or viewed at mobile display 182 (FIG. 3). Optionally, camera 160 may be movably or, alternatively, fixedly mounted (e.g., on or within appliance 100). When assembled, camera 160 may have a set field of view (e.g., region of appliance 100 or the surrounding environment that may be captured within a two-dimensional image at camera 160).

As an example, FIG. 4 illustrates an exemplary two-dimensional image such as might be captured at camera 160 (FIG. 2) as part of an image capture sequence. In other words, the images at FIG. 4 illustrates a set field of view (or sub-region thereof) for camera 160 directed toward fresh food chamber 122. Optionally, once captured (e.g., as part of an image capture sequence), the image at FIG. 4 may be viewed at display 180 or 182. Generally, FIG. 4 provides a view/image in which a drawer 142 is in an opened state, is empty (e.g., does not hold any stored items), and is unobstructed (e.g., prior to or after a user appendage 230—FIG. 5—is within the set field of view between the camera 160 and the drawer 142).

As an additional or alternative example, FIG. 5 illustrates another exemplary two-dimensional image such as might be captured at camera 160 as part of an image capture sequence. In other words, the image at FIG. 5 illustrates a set field of view (or sub-region thereof) for camera 160 (FIG. 2) directed toward fresh food chamber 122. Optionally, once captured (e.g., as part of an image capture sequence), the image at FIG. 5 may be viewed at display 180 or 182. Generally, FIG. 5 provides a view/image in which a drawer 142 is in an opened state, contains one or more stored items 234, and includes a user appendage 230 (e.g., hand) of a user.

In certain embodiments, controller 150 is configured to evaluate the content of one or more two-dimensional images from camera(s) 160 to help identify a particular user or item. As an example, controller 150 may be configured to identify a particular user associated with a stored user profile or stored item 234 being engaged (e.g., for insertion in or removal from chamber 122) by the user based on signals or images received from the camera 160 (e.g., during or prior to an image capture sequence). For instance, from the two-dimensional images captured from the camera 160, the controller 150 may identify the drawer 142 has been positioned within a predetermined sub-region (e.g., bounding zone 216) of the set field of view of camera 160. Generally, each two-dimensional image includes multiple pixels (e.g., arranged in a predefined grid), as is understood. In some embodiments, the predetermined bounding zone 216 establishes a two-dimensional grid or sub-region of pixels that is fixed relative to fresh food chamber 122 (e.g., forward therefrom).

Within the field of view of camera 160, a further sub-portion of pixels may be identified as containing a user appendage 230 or stored item 234, generally. As an example, it may be determined that an appendage-occupied region 232 that bounds a generic user appendage 230 is captured in a two-dimensional image. Such a determination may be made, for example, using any suitable detection routine (e.g., executed at the controller 150) to detect the outline or general shape of a user appendage 230 in a two-dimensional image, as would be understood. Once such the appendage-occupied region 232 is determined to be present, the pixels therein may be further analyzed (e.g., using a suitable identification routine executed at the controller 150). The analyzation may include a comparison of the appendage-occupied region 232 to one or more stored user profiles, each corresponding to a different user and including a corresponding dataset (e.g., of recorded metadata or images associated with that user profile). From the analyzation of the appendage-occupied region 232, one or more scores (e.g., confidence scores) may be generated. For instance, a unique confidence score may be generated for each user profile, thereby generally indicating the calculated likelihood that the appendage-occupied region 232 captures a user appendage 230 of the user corresponding to a particular user profile. In some embodiments, the confidence score may indicate to what percentage the captured user appendage 230 (i.e., data therefor) matches the appendage (i.e., data therefor) associated with a particular user profile.

Additionally or alternatively, a stored item 234 (e.g., detected or determined within an item-occupied region 236) in the two-dimensional image may be identified by a suitable identification routine, such as edge matching, divide-and-conquer search, greyscale matching, histograms of receptive field responses, or another suitable routine (e.g., executed at the controller 150 based on one or more captured images from one or more cameras 160).

Optionally, a common user appendage 230 or stored item 234 may be matched in multiple images captured by one or more cameras 160. In some such embodiments, it may be first determined that a specific item is present in multiple images by determining that an occupied region 232 or 236 (i.e., the same occupied region) is present within multiple images. Then, the occupied region 232 or 236 of the multiple images may be matched such that it is established that the occupied region 232 or 236 is being occupied by a common item (e.g., appendage 230 or stored item 234) in the multiple images. Subsequently, the multiple images may each being analyzed at the common occupied region 232 or 236 to help identify the specific item (e.g., as a particular user's appendage 230 or a particular stored item 234). As an example, the same item 230 or 234 may be recognized as being present in multiple images captured by the same camera 160. Thus, a single item (e.g., appendage 230 or stored item 234) may be identified as it moves across the field of view of a single camera 160. As an additional or alternative example, the same item may recognized as being present in multiple images captured by discrete cameras 160. Thus, a single item (e.g., user appendage 230 or stored item 234) may be identified as being captured within multiple distinct fields of view.

Figure 6:
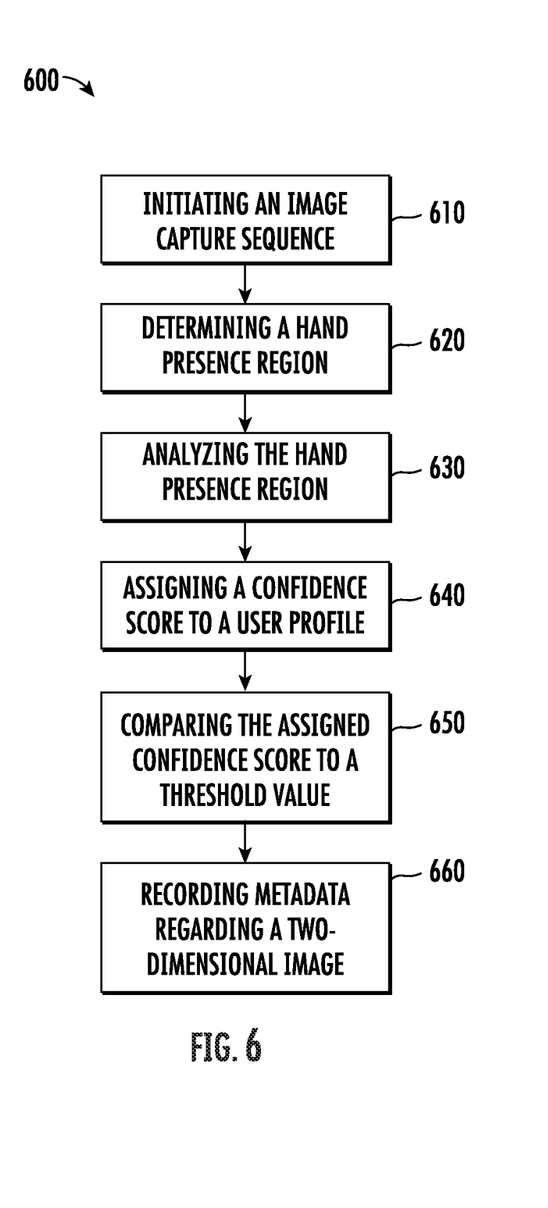
FIG. 6 provides a flow chart illustrating a method of operating a refrigerator appliance according to exemplary embodiments of the present disclosure.

Turning now to FIG. 6, a flow chart is provided of a method 600 according to exemplary embodiments of the present disclosure. Generally, the method 600 provides a method of operating a refrigerator appliance 100 (FIG. 1) that includes a camera 160 or digital display (e.g., integrated display 180 or mobile display 182), as described above. The method 600 can be performed, for instance, by the controller 150 (FIG. 3). For example, controller 150 may, as discussed, be in communication with camera 160, integrated display 180 (FIG. 3), or mobile display 182 (FIG. 3). During operations, controller 150 may send signals to and receive signals from camera 160, integrated display 180, or mobile display 182. Controller 150 may further be in communication with other suitable components of the appliance 100 to facilitate operation of the appliance 100 generally.

Advantageously, methods in accordance with the present disclosure may permit an efficient processing of one or more two-dimensional images to identify a particular user who is engaging with an appliance at a given moment.

FIG. 6 depicts steps performed in a particular order for purpose of illustration and discussion. Those of ordinary skill in the art, using the disclosures provided herein, will understand that the steps of any of the methods disclosed herein can be modified, adapted, rearranged, omitted, or expanded in various ways without deviating from the scope of the present disclosure (except as otherwise described).

At 610, includes initiating an image capture sequence at the camera module. The image capture sequence may include capturing a plurality of two-dimensional images (e.g., a first two-dimensional image, a second two-dimensional image, etc.), such as within a video feed or a series of sequential static images (e.g., taken or captured according to a predetermined rate or condition). Optionally, multiple images (e.g., the first and second images) may be captured at the same camera module or, alternatively, at another camera module (e.g., the first image may be captured at a first camera module, and the second image may be captured at a second camera module). Upon being captured at the camera module, the two-dimensional images may be transmitted to the controller (e.g., as a data signal). The two-dimensional images may then be recorded (e.g., temporarily) for comparison or evaluation.

In certain embodiments, the image capture sequence is initiated in response to detecting movement within a chilled chamber (e.g., fresh food chamber) of the refrigerator appliance. Thus, recording or evaluating two-dimensional images from the camera module may be prevented until movement is detected. As an example, movement may be detected at the camera module directed at the chilled chamber. Specifically, changes in light or pixels captured by the camera module may be detected (e.g., between multiple images captured over time) indicating the movement of one or more objects within the field of view of the camera module, as is generally understood. As another example, movement may be detected in response to receiving a signal from a separate sensor, such as a switch selectively engaged with the door. Such switches are generally understood and may, for instance, simultaneously control activation of a light for illuminating the chilled chamber. Opening the refrigerator door may thus activate the light and transmit a signal indicating motion within the chilled chamber.

Optionally, the image capture sequence may continue until one or more end conditions are met. As an example, an end condition may include expiration of a predetermined time period (e.g., span of time) following the start of a corresponding detection of movement. As another example, an end condition may include failure to detect further changes in sequential images of the image capture sequence. In other words, the image capture sequence may end after sequential images stop changing or detecting further movement. The end condition may specifically require a preset number or time period of unchanged sequential images. As yet another example, an end condition may include detecting closure of the door to the chilled chamber. In other words, the image capture sequence may end in response to the door being moved to the closed position.

At 620, the method 600 includes determining an appendage-occupied region within a two-dimensional image of the image capture sequence. In particular, the appendage-occupied region may be less than the entirety of the two-dimensional image (i.e., a sub-portion of the total pixels of the two-dimensional image). Optionally, 620 may include determining a corresponding appendage-occupied region within multiple images (e.g., the first image and the second image), such as to track or capture different portions of the same user appendage. Thus, 620 may include determining a first appendage-occupied region within the first image (e.g., capturing a particular user appendage), determining a second appendage-occupied region within the second region (e.g., capturing the particular user appendage).

Generally, a suitable detection routine may be executed to detect (e.g., automatically or without direct user instruction) the general outline, shape, or presence of a user appendage in the two-dimensional image, as would be understood. Thus, a determination may be made whenever (e.g., in response to) a user places an appendage within the field of view of the camera during image capture sequence. Since the appendage-occupied region is merely being determined, the user need not necessarily be a previous or established user of the appliance and a corresponding user profile is not necessarily required to be established prior to 620.

At 630, the method 600 includes analyzing the appendage-occupied region (e.g., in response to determining the appendage-occupied region at 620). In particular, pixels within the appendage-occupied region may be processed according to a suitable identification routine, such as edge matching, divide-and-conquer search, greyscale matching, histograms of receptive field responses, etc. Optionally, 630 includes comparing the appendage-occupied region of the two-dimensional image to one or more previously-established user profiles. For instance, pixels (or results of an identification routine) of the appendage-occupied region may be compared to recorded metadata or images associated with a particular user profile (e.g., each user profile of a plurality of user profiles) stored within the appliance.

At 640, the method 600 includes assigning a confidence score to a user profile based on the analysis of 630. For example, the analysis may be based on the comparison between the appendage-occupied region and the recorded data (e.g., metadata or images) of a particular user profile. If multiple user profiles are provided, multiple confidence scores may be assigned (e.g., each confidence score corresponding to a discrete user profile).

In some embodiments, such as those wherein multiple images are captured, 640 includes assigning multiple temporal probability scores (i.e., temporary, single-image, confidence scores) in order to calculate the confidence score for a particular user profile. As an example, a first temporal probability score may be assigned to the first image based on the analysis thereof. The first temporal probability score may indicate the calculated likelihood that the appendage-occupied region in the first image captures a user appendage associated with a particular user profile (e.g., to what percentage the captured user appendage in the first image matches the appendage associated with the particular user profile). As another example, a second temporal probability score may be assigned to the second image based on the analysis thereof. The second temporal probability score may indicate the calculated likelihood that the appendage-occupied region in the second image captures a user appendage associated with a particular user profile (e.g., to what percentage the captured user appendage in the second image matches the appendage associated with the particular user profile). Once multiple temporal probability scores are assigned, the temporal probability scores may be further analyzed to determine the confidence score. Optionally, the temporal probability scores may be applied to a predetermined function to calculate the confidence score. As an example, the predetermined function may be a mean function such that the confidence score is calculated as the mean value of the temporal probability scores (e.g., the mean value of the first and second temporal probability scores). As another example, the confidence score may be selected as the largest value (i.e., maximum) of the plurality of temporal probability scores. For instance, if the first temporal probability score is greater than the second probability score, the first temporal probability score may be used as (e.g., in place of) the confidence score.

At 650, the method 600 includes comparing the assigned confidence score to a threshold score. The threshold score may, for instance, be determined in advance and stored within the appliance. Moreover, the threshold score may set a minimum score for which the appliance can associate the user appendage within the appendage-occupied region with a particular user profile. In other words, the threshold score may establish whether the appliance can identify the user appendage as belonging to a particular user (e.g., absent any contrary or overriding data). An assigned confidence score that is greater than the threshold may generally indicate the user appendage in the captured appendage-occupied region may be confirmed as belonging to a particular user or user profile. By contrast, an assigned confidence score that is less than or equal to the threshold score may generally indicate the user appendage in the captured appendage-occupied region may be unable to be confirmed as belonging to a particular user or user profile.

Optionally, the discrete confidence scores corresponding to a plurality of user profiles may be compared. The highest confidence score may thus indicate the user appendage in the captured appendage-occupied region may be confirmed as belonging to that particular user or user profile (e.g., irrespective of whether the lower confidence scores are greater than the threshold score).

At 660, the method 600 includes recording metadata regarding the two-dimensional image based on comparing the assigned confidence score. In particular, the metadata, such as data generated in the analysis of 630 regarding the two-dimensional image or images (e.g., first and second images), may be recorded. Recording and associating the metadata with a particular user profile (if any) may generally indicate that the captured user appendage belongs to a particular user. As an example, if or when the assigned confidence score for a particular user profile is determined to be greater than the threshold score (e.g., or the assigned user confidence score for every other stored user profile), 660 may include associating the recorded metadata with the particular user profile. Thus, it may be determined that the user appendage captured in the two-dimensional image(s) identifies the particular user associated within particular user profile. As an additional or alternative example, if or when the assigned confidence score for a particular user profile is determined to be less than or equal to the threshold score, 660 may include associating the recorded metadata with a separate profile that is distinct or different from the particular user profile. The separate profile may be associated with another known user, for instance, or be generated in response to 650 [e.g., if no known user corresponds to the user appendage captured in the two-dimensional image(s)].

Following or in tandem with recording metadata, the method 600 may include identifying a stored item (e.g., food item) engaged with the user appendage within the two-dimensional image. For instance, within the two-dimensional image(s), it may determined that the user appendage overlaps or engages (e.g., contacts) a specific stored item. The stored item itself may be identified based on an analysis of an item-occupied region, such as by edge matching, divide-and-conquer search, greyscale matching, histograms of receptive field responses, or another suitable routine, as would be understood. Subsequent or previous sequential images may be further analyzed to track the user appendage engagement with the stored item. In other words, the method 600 may include tracking the engagement, such as to determine if the user has inserted or removed the stored item.

After identifying the stored item, the method 600 may include associating the stored item with the same particular user profile that the user appendage is associated with (e.g., at 660). Thus, the particular user's engagement may be automatically determined or recorded. In some such embodiments, associating the stored item includes recording the stored item in a user database (e.g., caloric intake database) of the user profile. Advantageously, the user's engagement with or caloric intake of stored items may be easily or automatically (e.g., at least in part) logged based on the user's own interactions with stored items provided to or removed from the appliance.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A refrigerator appliance comprising:
   a cabinet defining a chilled chamber;
   a door being rotatably hinged to the cabinet to provide selective access to the chilled chamber;
   a camera module mounted to the cabinet; and
   a controller operably coupled to the camera module, the controller being configured to initiate an operation routine comprising
      initiating an image capture sequence at the camera module, the image capture sequence comprising a first two-dimensional image captured at the camera module and a second two-dimensional image captured at the camera module subsequent to the first image,
      determining an appendage-occupied region within the first two-dimensional image,
      analyzing the appendage-occupied region in response to determining the appendage-occupied region,
      assigning a confidence score to a user profile stored in the controller based on analyzing the appendage-occupied region,
      comparing the assigned confidence score to a threshold score,
      recording metadata regarding the first two-dimensional image based on comparing the assigned confidence score,
      determining an appendage-occupied region within the second two-dimensional image, and
      analyzing the appendage-occupied region within the second region in response to determining the appendage-occupied region within the second two-dimensional image;
   wherein assigning the confidence score comprises
      determining a first temporal probability score of the user profile according to the first two-dimensional image,
      determining a second temporal probability score of the user profile according to the second two-dimensional image, and
      calculating the confidence score based on the first temporal probability score and the second temporal probability score.

2. The refrigerator appliance of claim 1, wherein comparing the assigned confidence score comprises determining the assigned confidence score is greater than the threshold score, and wherein recording metadata comprises associating the recorded metadata with the user profile.

3. The refrigerator appliance of claim 1, wherein comparing the assigned confidence score comprises determining the assigned confidence score is less than or equal to the threshold score, and wherein recording metadata comprises associating the recorded metadata with a separate profile distinct from the user profile.

4. The refrigerator appliance of claim 1, wherein calculating the confidence score comprises selecting the confidence score as a maximum value of a plurality of temporal probability scores, the plurality of temporal probability scores comprising the first temporal probability score and the second temporal probability score.

5. The refrigerator appliance of claim 1, identifying a stored item engaged with the user appendage within the first two-dimensional image.

6. The refrigerator appliance of claim 5, associating the stored item with the user profile.

7. The refrigerator appliance of claim 1, wherein the user profile is a first profile of a plurality of user profiles stored within the controller, wherein the assigned confidence score is a first confidence score, and wherein the operation routine further comprises
   assigning a discrete confidence score to each user profile of the plurality of user profiles based on analyzing the appendage-occupied region.

8. The refrigerator appliance of claim 7, wherein the operation routine further comprises
   comparing each discrete confidence score, and
   associating the first confidence score with the first profile based on comparing each discrete confidence score.

9. The refrigerator appliance of claim 1, wherein determining the appendage-occupied region within the first two-dimensional image comprises matching appendage-occupied regions within a plurality of two-dimensional images, and wherein analyzing the appendage-occupied region comprises analyzing appendage-occupied regions within the plurality of two-dimensional images.

10. A method of operating a refrigerator appliance comprising a camera module mounted within a cabinet at a chilled chamber, the method comprising:
   initiating an image capture sequence at the camera module, the image capture sequence comprising a first two-dimensional image captured at the camera module and a second two-dimensional image captured at the camera module subsequent to the first image;
   determining an appendage-occupied region within the first two-dimensional image;
   analyzing the appendage-occupied region in response to determining the appendage-occupied region;
   assigning a confidence score to a user profile stored in a controller based on analyzing the appendage-occupied region;
   comparing the assigned confidence score to a threshold score;
   recording metadata regarding the first two-dimensional image based on comparing the assigned confidence score;
      determining an appendage-occupied region within the second two-dimensional image, and
      analyzing the appendage-occupied region within the second region in response to determining the appendage-occupied region within the second two-dimensional image;
   wherein assigning the confidence score comprises
      determining a first temporal probability score of the user profile according to the first two-dimensional image,
      determining a second temporal probability score of the user profile according to the second two-dimensional image, and
      calculating the confidence score based on the first temporal probability score and the second temporal probability score.

11. The method of claim 10, wherein comparing the assigned confidence score comprises determining the assigned confidence score is greater than the threshold score, and wherein recording metadata comprises associating the recorded metadata with the user profile.

12. The method of claim 10, wherein comparing the assigned confidence score comprises determining the assigned confidence score is less than or equal to the threshold score, and wherein recording metadata comprises associating the recorded metadata with a separate profile distinct from the user profile.

13. The method of claim 10, wherein calculating the confidence score comprises selecting the confidence score as a maximum value of a plurality of temporal probability scores, the plurality of temporal probability scores comprising the first temporal probability score and the second temporal probability score.

14. The method of claim 10, identifying a stored item engaged with the user appendage within the first two-dimensional image.

15. The method of claim 14, associating the stored item with the user profile.

16. The method of claim 10, wherein the user profile is a first profile of a plurality of user profiles stored within the controller, wherein the assigned confidence score is a first confidence score, and wherein the method further comprises:
   assigning a discrete confidence score to each user profile of the plurality of user profiles based on analyzing the appendage-occupied region.

17. The method of claim 16, further comprising:
   comparing each discrete confidence score; and
   associating the first confidence score with the first profile based on comparing each discrete confidence score.

18. The method of claim 10, wherein determining the appendage-occupied region within the first two-dimensional image comprises matching appendage-occupied regions within a plurality of two-dimensional images, and wherein analyzing the appendage-occupied region comprises analyzing appendage-occupied regions within the plurality of two-dimensional images.

19. A method of operating a refrigerator appliance comprising a camera module mounted within a cabinet at a chilled chamber, the method comprising:
   initiating an image capture sequence at the camera module, the image capture sequence comprising a first two-dimensional image captured at the camera module and a second two-dimensional image captured at the camera module subsequent to the first image;
   determining an appendage-occupied region within the first two-dimensional image;
   analyzing the appendage-occupied region in response to determining the appendage-occupied region;
   assigning a discrete confidence score to each user profile of a plurality of user profiles based on analyzing the appendage-occupied region, the plurality of user profiles comprising a first user profile;
   comparing each discrete assigned confidence score;
   recording metadata regarding the first two-dimensional image based on comparing each discrete assigned confidence score;
   determining an appendage-occupied region within the second two-dimensional image, and
   analyzing the appendage-occupied region within the second region in response to determining the appendage-occupied region within the second two-dimensional image;
   wherein assigning each discrete confidence score comprises
      determining a first temporal probability score of the first user profile according to the first two-dimensional image,
      determining a second temporal probability score of the first user profile according to the second two-dimensional image, and
      calculating a first confidence score based on the first temporal probability score and the second temporal probability score.

20. The method of claim 19, further comprising associating the first confidence score with the first profile based on comparing each discrete confidence score, wherein determining the appendage-occupied region within the first two-dimensional image comprises matching appendage-occupied regions within a plurality of two-dimensional images, and wherein analyzing the appendage-occupied region comprises analyzing appendage-occupied regions within the plurality of two-dimensional images.

* * * * *